(12) United States Patent
Diego Ferres Dellapiane et al.

(10) Patent No.: US 8,692,004 B2
(45) Date of Patent: Apr. 8, 2014

(54) PROCESS FOR PURIFICATION OF VEGETABLE OILS UPON WITHDRAWAL OF SOLIDS BY CENTRIFUGATION IN THE MISCELLA STAGE

(75) Inventors: Juan Diego Ferres Dellapiane, Sao Paulo (BR); Jose Anthero Catanio Pelloso, Lucelia (BR)

(73) Assignee: Granol Industria Comercio e Exportacao SA, Goiania (BR)

( * ) Notice: Subject to any disclaimer, the term of this patent is extended or adjusted under 35 U.S.C. 154(b) by 0 days.

(21) Appl. No.: 13/813,899

(22) PCT Filed: Feb. 14, 2011

(86) PCT No.: PCT/BR2011/000042
§ 371 (c)(1),
(2), (4) Date: Feb. 1, 2013

(87) PCT Pub. No.: WO2012/016307
PCT Pub. Date: Feb. 9, 2012

(65) Prior Publication Data
US 2013/0131362 A1 May 23, 2013

(30) Foreign Application Priority Data
Aug. 2, 2010 (BR) .............................. 01810028053

(51) Int. Cl.
*C07F 9/02* (2006.01)
(52) U.S. Cl.
USPC ........................................... 554/83; 554/206

(58) Field of Classification Search
USPC .................................................. 554/83, 206
See application file for complete search history.

(56) References Cited

FOREIGN PATENT DOCUMENTS

| GB | 582557 A | 11/1946 |
| GB | 632304 A | 11/1949 |
| GB | 632304 A | * 11/1949 |
| GB | 766394 A | 1/1957 |
| GB | 1120456 A | 7/1968 |
| JP | 1138298 A | * 5/1989 |
| JP | 1138298 A | 5/1989 |
| UA | 15120 U | 6/2006 |
| UA | 151204 U | * 6/2006 |

* cited by examiner

*Primary Examiner* — Deborah D Carr
(74) *Attorney, Agent, or Firm* — Muncy, Geissler, Olds & Lowe, P.C.

(57) ABSTRACT

Process for purification of vegetable oils upon withdrawal of solids by centrifugation in the miscella stage consists of the industrial extraction of vegetable oils, including the soybean oil by using a solvent, usually a mixture of hydrocarbons, in which the main constituent is hexane. The percolation extractors that operate continuously and in countercurrent provide an optimized extraction and a good performance. The replacement of the traditional miscella purification processes by a process of Centrifugation in the mixture of oil and solvent (miscella) within the process with the removal of solids contained therein, returning it to the extractor results in final products as oil and lecithin of a better quality, also providing a better functioning of the process by avoiding fouling in heat exchangers and distillation of solvent, reducing downtime and lower fuel consumption resulting in lower production costs.

9 Claims, 1 Drawing Sheet

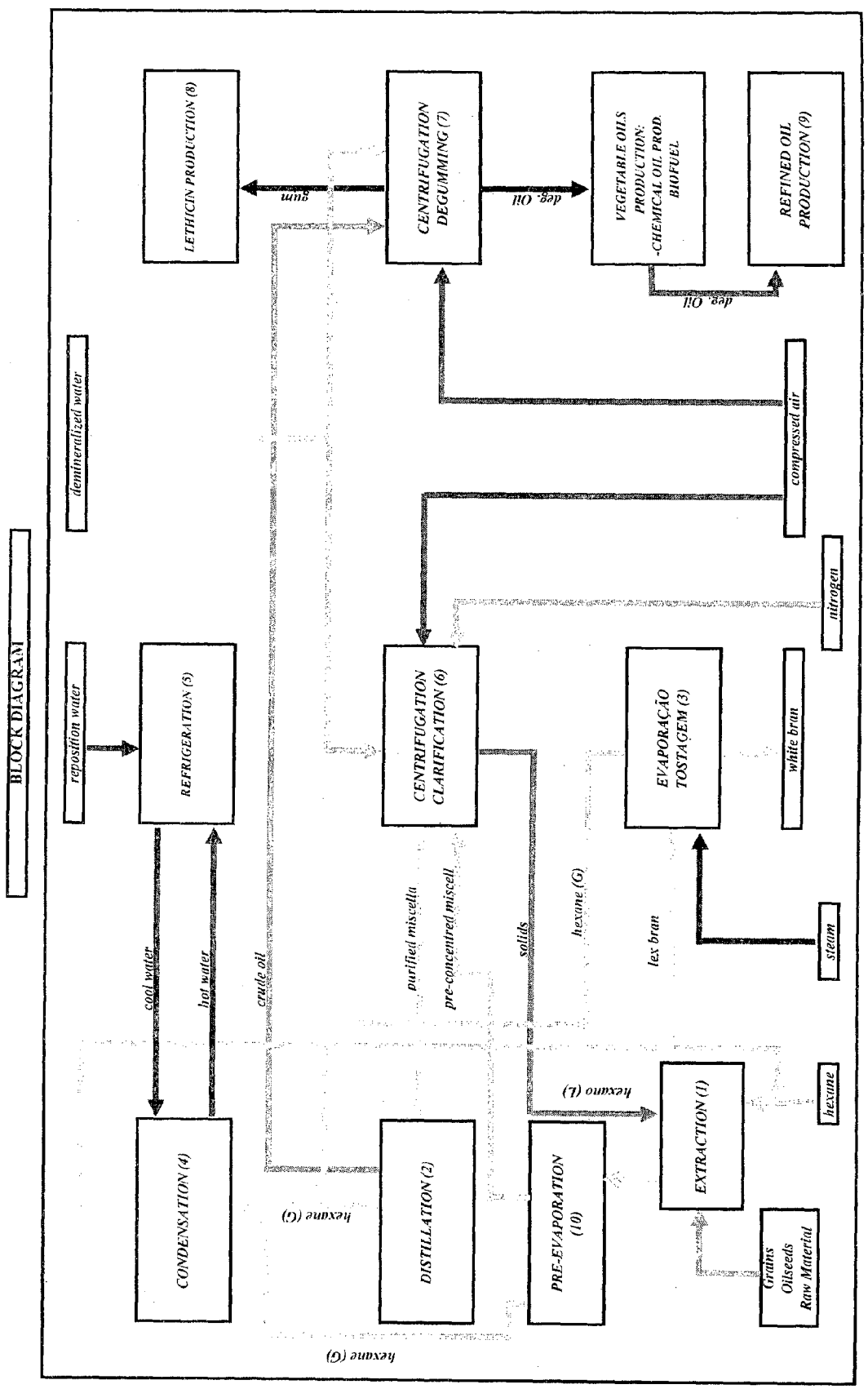

PROCESS FOR PURIFICATION OF VEGETABLE OILS UPON WITHDRAWAL OF SOLIDS BY CENTRIFUGATION IN THE MISCELLA STAGE

The present application for invention patent, description object and claims of this report, refers to an inventive solution in the field of application in the extraction of vegetable oils and production of lecithin or other applications in which a purification of a vegetable oil being extracted by extraction with solvent has qualitative advantages by moving its purification to the miscella stage within the extraction process, which breaks new ground by devising a process based on the development of a separation technique for the use of centrifugal force and subsequent cleaning of the still dissolved vegetable oil in the miscella to retrieve it later already purified.

Such operation of centrifugation results in the purification of vegetable oil at the miscella stage for several purposes, including the production of lecithin.

BACKGROUND OF THE ART

In order to provide veracity to the context explained at the introductory framework, it will be presented a brief explanation about the state of the art for existing processes, where it will be possible for the one skilled in the art to recognize its limiting aspects, for at a later date to discuss the added benefits with the introduction of this novel process claimed.

For the purification of the miscella, it is currently, used filtration techniques employing hydrocyclones, filter presses or other types of closed filters equipped with filter elements consisting of metallic screens that require physical space availability in the extraction plant due to its size and a need for a system under "stand by" due to the cycle of frequent cleaning of such equipment, which may be by counter-current washing.

Critical Analysis of the State of the Art

Compared to the proposed process, the technique currently used is much more expensive in the deployment phase due to the cost of the physical space to be occupied adding the need for the equipment under stand by, as in the operation, because it requires the use of materials and supplies specific to the process, and requires a greater employment of labor due to operational need and constant cleaning.

The current art also creates solid waste, which causes an environmental concern for its adequate disposal or reuse, when possible.

Currently the process of lecithin purification or any other applications to purify the oil contained in the miscella (mixture of vegetable oil and solvent) removing the solid waste from it, is done through the use of hydrocyclones, filters of different types or combinations of both processes always to miscella.

The lecithin purification process carried out in the crude vegetable oil stage is made by all kinds of filters or through the use of centrifuges.

The use of hydrocyclones does not guarantee the adequate removal of the solids from the miscella. The solid wastes that are not retained form deposits on the interior of the equipment of the later stages of the process (evaporators, heat exchangers, etc.) reducing their effectiveness and causing the need for increasing the energy demand in the form of saturated steam. This directly implies in the increased operating costs for obtaining the saturated steam by the boilers of the manufacturing plant and mainly in increased process temperatures, resulting in a final product with darker lower quality standard and lower commercial value.

Filters generally, compared to the hydrocyclones, provide increased safety and should be totally closed, and appear to be more adequate to the solid removal process. However, they encumber the process due to the need of using specific clarification auxiliaries, or wire mesh fabrics for its operation and periodic cleaning or countercurrent washing.

The filters can be employed in the separation of solids in the miscella stage, as well as at the crude oil stage. In any of these situations they appear to be more adequate to the solid removal process. However, they are not totally efficient. Thus, when used in the miscella stage, even within a little over extended time, there are the same problems of incrustation, gradual increase in consumption of saturated steam, rising temperatures of the process and decomposition of the final product quality. Further, when in miscella stage, they are extremely large and expensive due to the enormous volume of liquid to be filtered.

When employed only in the final stage of the separation and purification process of the crude vegetable oil, filters remove the solid waste after the separation process between oil and solvent, so that operational problems mentioned above are still present in this distillation of the solvent with the solid still present, and worsening even more, the final product quality.

There is also the alternative of using both equipment in series: hydrocyclones for the removal of larger particles in the miscella stage and filter press for the actual clarification of the crude vegetable oil (non-degummed), thus providing an advantage (relative) due to increased operating cycle of the filter before saturation and need for cleaning.

However, the combination of the two stages also combines the disadvantages and limitations of both processes representing a limited improvement.

In addition to the shortcomings already mentioned in the above techniques, it is also pointed out:

Need of physical space available inside the industrial plant for the installation of equipment;

High investment by the need of acquiring two systems to be installed in parallel, because one must be on stand by to be in operation while the other is paralyzed for cleaning due to saturation of the filter (usually, cycles between cleaning are approximately of 24 hours);

When there is only one system for operation, a storage lung tank must be acquired for storing miscella, while the cake removal and cleaning of filters is performed.

In the patent literature, one can find references to the process of the prior art of which we mentioned from the PI 0509684-7 from Jul. 4, 2005 entitled "ENZYMATIC PRODUCTION OF HYDROLYSED LECITHIN PRODUCTS" which is an implementation to produce a hydrolyzed product that contains hydrolyzed phospholipids, monoglycerides and diglycerides. The method includes the steps of: contact as a starting material, such as a lecithin, which includes a phospholipid component and a triglyceride component, in an aqueous or organic solvent medium, with a first enzyme effective to hydrolyze the phospholipid, and contact, substantially, with the product of the stage with a second enzyme, effective to hydrolyze the triglyceride.

PROPOSAL OF THE INVENTION

The present invention "PROCESS FOR PURIFICATION OF VEGETABLE OILS UPON WITHDRAWAL OF SOLIDS BY CENTRIFUGATION IN THE MISCELLA STAGE" converges in economy both for the initial investment and its implementation, since it occupies a smaller area and uses smaller amount of equipment, as well AS for the costs of industrial production because it does not require the use of clarifier inputs nor increased manpower for its operation. Another advantage in relation to the traditional process is that it does not create solid waste from the new process.

The centrifugation process is shown demonstrably more effective in solid waste disposal at the miscella stage, significantly reducing the problems of fouling in the process equipment and consequent reduction in operating costs and greater assurance of obtaining a final product with better quality and greater commercial value.

BRIEF DESCRIPTION OF THE DRAWING

FIG. 1 represents the flowchart of the "PROCESS FOR PURIFICATION OF VEGETABLE OILS UPON WITHDRAWAL OF SOLIDS BY CENTRIFUGATION IN THE MISCELLA STAGE";

DETAILED DESCRIPTION in order to consolidate the present invention, the applicant presents in the following paragraphs a embodiment of this process, pointing out that it is not intended to limit the scope of the invention, which is only limited to what is explained in the claim board.

Disclosed Process:

The industrial extraction of the soybean oil is carried out by using a solvent, generally a mixture of hydrocarbons, where the main compound is the hexane. The percolation extractors, particularly the solid-liquid extractors that operate continuously and in countercurrent provide an optimized extraction and a good performance.

The extraction process (1) results in two currents: mixture between oil and hexane, known as miscella, and mixture of bran and hexane, also called as oat bran. The first current will provide the vegetable oil by the pre-evaporation process (10) followed by distillation (2), and the second will provide white bran by the process of evaporation and browning (3) with saturated steam. The White bran produced in this stage is ready for the animal consumption.

The solvent recovered in stages (2) and (3) is in a gas state, and should be condensed so that it could be reused at the extraction stage. The condensation (4) is possible thanks to the energy exchange between gases (steam) and the refrigeration water. The hot water that leaves the stage (4) should be cooled down for future reuse. The equipment responsible for the refrigeration process (5) is the cooling towers, where the heat exchange is made by direct contact with the air. Water loss by evaporation and drag should be restored for the good operation of the equipment.

In the step of distillation, the miscella must be clarified so that the fine solids, which passed through the extractor screens, can be removed. The withdrawal of such solids, in addition to allow the production of vegetable oil and lecithin with increased quality, also protects the equipment from distillation against possible incrustation. Clarification of the miscella by centrifugation (6) has many advantages over traditional methods (hydrocyclones and filters) as previously reported. In order to make it feasible, it is also used the pre-evaporation feature (10) by adjusting the miscella concentration to the ideal conditions for centrifugation (6).

Solids removed from the stage (6) return to the extractor. The centrifugal clarifying needs utilities like demineralized water and clean and dry compressed air for the operation and nitrogen for blanketing operation. The heavy phase consisting on solids that are to be removed returns from the centrifuge to the extractor so there is no exit from the heavy phase of the installation. The miscella deriving from the step (1) goes to the stage of pre-concentration (10) whose output is the clarifying centrifuge machine feed (6) and the miscella purified returning to stage (2) is the output of the light phase. The purified miscella then returns to its normal sequence until the distillation end.

The crude oil obtained in stage (2), already free from solids, is sent to a second centrifugation step (7), where the gums are separated and sent to the facility responsible for producing lecithin (8). This degumming centrifugal also needs demineralized water and compressed air for operation. The nitrogen blanketing is not necessary, since all solvent has been removed in step (2).

The gum already separated has approximately 50% of moisture and already presents an increased quality. The next process of drying, where moisture is reduced to a value ranging from 0.05% to 2.00% inclusive, allows obtaining a food grade lecithin.

The degummed oil from step (7) has also an increased quality and is sent to the facility responsible for the production of refined oil (9), also known as refinery. This step is basically formed by the processes of physical or alkaline neutralization, clarification (bleaching) and deodorizing and filtering where it obtains at all stages a better-quality oil with less breakage. The oil produced in this installation is ready for human consumption.

The embodiment described in this detailing topic of the inventive process is provided only as example. Changes, alterations and variations can be carried out for any others particular embodiments for those skilled in the art without, however, differing from the purpose disclosed in the patent application, which is exclusively defined by the attached claims.

The invention claimed is:

1. PROCESS FOR PURIFICATION OF VEGETABLE OILS UPON WITHDRAWAL OF SOLIDS BY CENTRIFUGATION IN THE MISCELLA STAGE, being the industrial extraction of soybean oil, comprising using a solvent in which the main constituent is hexane, percolation extractors, which operate continuously and in countercurrent, with an optimized extraction (1) resulting in two streams, the mixture of oil and hexane, known as miscella, and the mixture of hexane and bran, bran also called lex; the first current will provide vegetable oil by the pre-evaporation process (10) followed by purification (6) and followed by distillation (2), and the second will provide white bran by the process of evaporation and browning (3) with saturated steam; and wherein solids removed in step (6) are returned to the extractor.

2. PROCESS FOR PURIFICATION OF VEGETABLE OILS UPON WITHDRAWAL OF SOLIDS BY CENTRIFUGATION IN THE MISCELLA STAGE, according to claim 1, comprising recovered solvent in steps (10), (2) and (3) being in a gaseous state (steam), and should be condensed so that it can be reused in the extraction step, the condensation (4) is possible thanks to the energy exchange between the gases and cooling water; hot water that leaves the stage (4) should be refrigerated for future use; equipment responsible for the cooling process (5) are the cooling towers, where the energy exchange is made by direct contact with air.

3. PROCESS FOR PURIFICATION OF VEGETABLE OILS UPON WITHDRAWAL OF SOLIDS BY THE CENTRIFUGATION IN THE MISCELLA PHASE according to claim 1, comprising the pre-evaporation stage (10), the miscella must be clarified so that the fine solids, which passed through extractor screens, can be removed; the clarifying of the miscella by centrifugation (6) from the mix between oil and solvent before the oil recovery that occurs after the distillation process (2) supplemented by "stripping" under vacuum.

4. PROCESS FOR PURIFICATION OF VEGETABLE OILS UPON WITHDRAWAL OF SOLIDS BY CENTRIFUGATION IN THE MISCELLA STAGE, according to claim 1, comprising the clarifying centrifuge requires utilities including demineralized water and clean and dry compressed air for operation and nitrogen for blanketing, the miscella from the step (1) is pre-concentrated in the step (10) and is the power of centrifugal machine and the miscella returning to step (2) is the output of the light phase, the miscella then resumes its normal sequence until the end of distillation and desolventizing.

5. PROCESS FOR PURIFICATION OF VEGETABLE OILS UPON WITHDRAWAL OF SOLIDS BY CENTRIFUGATION IN THE MISCELLA STAGE, according to claim 1, comprising crude oil obtained in step (2), already free from solid and solvent, being sent to a second centrifugation step after hydration by addition of water (7), where the gums are separated and sent to the facility responsible for producing lecithin (8), and said degumming centrifuge also needs demineralized water and compressed air for operation.

6. PROCESS FOR PURIFICATION OF VEGETABLE OILS UPON WITHDRAWAL OF SOLIDS BY CENTRIFUGATION IN THE MISCELLA STAGE, according to claim 1, wherein consequent drying, where moisture is reduced from 0.05% to 2%, and allows the obtainment of a food grade lecithin.

7. PROCESS FOR PURIFICATION OF VEGETABLE OILS UPON WITHDRAWAL OF SOLIDS BY CENTRIFUGATION IN THE MISCELLA STAGE, according to claim 1, comprising degummed oil from step (7) being sent to the facility responsible for the production of refined oil (9), also known as refinery and this step is basically formed by the processes of physical or alkaline neutralization, clarification (bleaching) and deodorizing and filtering.

8. PROCESS FOR PURIFICATION OF VEGETABLE OILS UPON WITHDRAWAL OF SOLIDS BY CENTRIFUGATION IN THE MISCELLA STAGE, according to claim 1, wherein the extraction steps (1), distillation (2), evaporation and browning (3), condensation (4) are or are not supplemented by the cooling steps (5), centrifugation (6), addition of water (7) which can be combined randomly giving other alternative destinations or products, whether in food production, biofuels or technical products.

9. PROCESS FOR PURIFICATION OF VEGETABLE OILS UPON WITHDRAWAL OF SOLIDS BY CENTRIFUGATION IN THE MISCELLA STAGE, according to claim 1, wherein said solvent is a mixture of hydrocarbons.

\* \* \* \* \*